United States Patent [19]
Borst

[11] Patent Number: 5,351,368
[45] Date of Patent: Oct. 4, 1994

[54] CLAMPING DEVICE FOR CLAMPING A PROTECTIVE HOOD ON THE CLAMPING COLLAR OF A HAND-OPERATED MACHINE TOOL

[75] Inventor: Erich Borst, Leinfelden-Echterdingen, Fed. Rep. of Germany

[73] Assignee: Robert Bosch GmbH, Stuttgart, Fed. Rep. of Germany

[21] Appl. No.: 965,262

[22] PCT Filed: Jun. 29, 1991

[86] PCT No.: PCT/DE91/00534
§ 371 Date: Jan. 5, 1993
§ 102(e) Date: Jan. 5, 1993

[87] PCT Pub. No.: WO92/00834
PCT Pub. Date: Jan. 23, 1992

[30] Foreign Application Priority Data
Jul. 5, 1990 [DE] Fed. Rep. of Germany ....... 4021510

[51] Int. Cl.$^5$ .................................. B65D 63/00
[52] U.S. Cl. ........................ 24/270; 24/273; 285/409
[58] Field of Search ............ 24/270, 273, 271, 272, 24/68 CD; 285/409, 365, 242

[56] References Cited

U.S. PATENT DOCUMENTS

| | | | |
|---|---|---|---|
| 629,315 | 7/1899 | Dorticus | 24/484 |
| 1,518,479 | 12/1924 | Brewer | 285/409 |
| 1,646,463 | 10/1927 | Stokesberry | 285/409 |
| 2,915,799 | 8/1959 | Andreasen | 24/270 |
| 3,042,430 | 7/1962 | Guy | 24/270 |

FOREIGN PATENT DOCUMENTS

| | | | |
|---|---|---|---|
| 54171 | 6/1982 | European Pat. Off. | |
| 3638337 | 1/1990 | Fed. Rep. of Germany | |
| 0735271 | 8/1955 | United Kingdom | 285/409 |

*Primary Examiner*—Victor N. Sakran
*Attorney, Agent, or Firm*—Michael J. Striker

[57] ABSTRACT

A clamping device for clamping a protective hood on a clamping collar of an angle grinder has, a clamping strap which has ends and is clampable together in the region of the ends, a clamping lever having one end and being pivotable at the one end about a pivot axis in respect of one of the ends of the clamping strap, and a transmission member which is engaged by the clamping lever and which engages at a distance from the clamping lever another of the ends of the clamping strap and during clamping brings the ends of the clamping strap nearer to one another. The transmission member, the clamping member, and the ends of the clamping strap form a toggle-lever device which during clamping contracts the clamping strap in the region of the ends of the clamping strap in a manner essentially free of any bending moment.

39 Claims, 3 Drawing Sheets

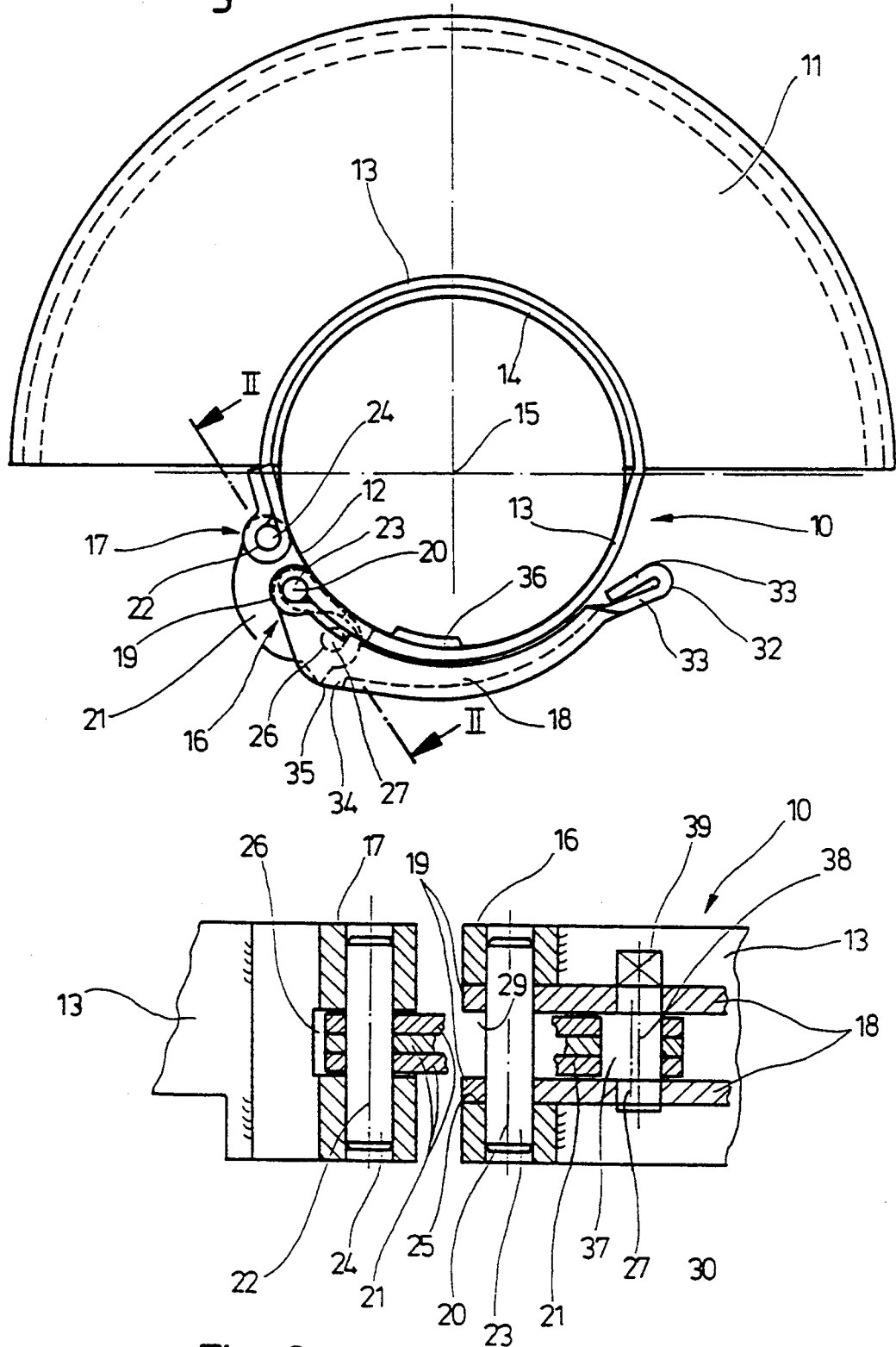

Fig. 3
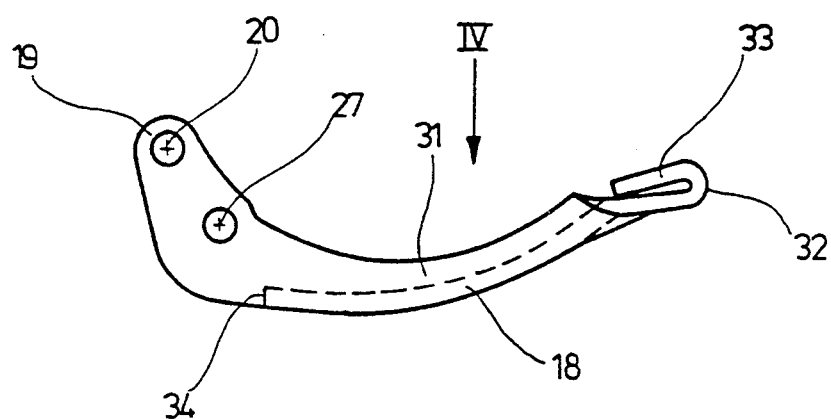
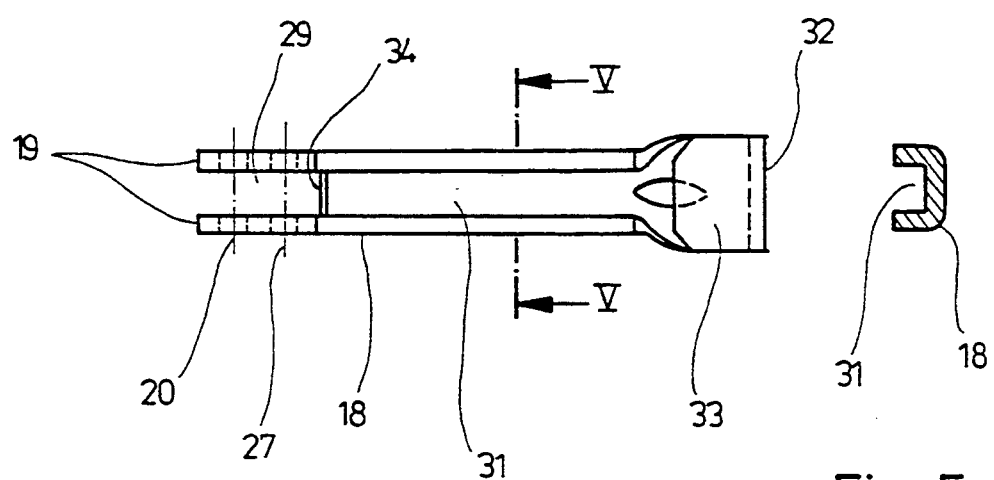
Fig. 4
Fig. 5

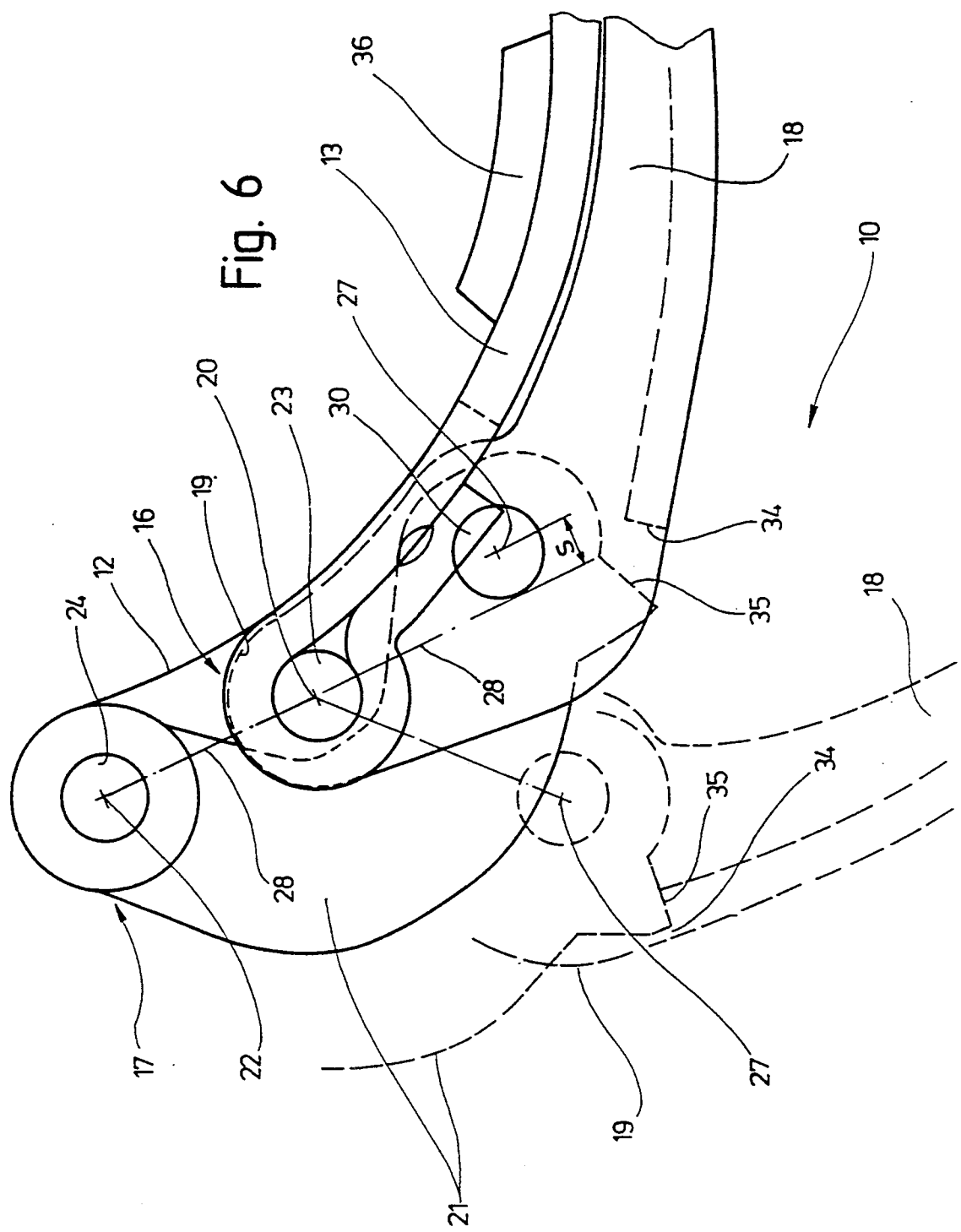

CLAMPING DEVICE FOR CLAMPING A PROTECTIVE HOOD ON THE CLAMPING COLLAR OF A HAND-OPERATED MACHINE TOOL

BACKGROUND OF THE INVENTION

The present invention relates to a clamping device for clamping a protective hood on the clamping collar of a hand-operated machine tool, especially of an angle grinder or such like electrical tool, according to the precharacterising clause of the main claim.

A clamping device of this type, in which each clamping-strap end has an outwardly bent tab, is known (German Offenlegungsschrift 3,638,337). The clamping lever engages with one end on a transmission member in the form of a clamping screw. For this purpose, the clamping lever is made approximately fork-shaped at its free end, the two fork legs engaging round the end of the clamping screw on both sides. A bolt passes through the clamping screw and the two fork legs and allows a pivotability of the clamping lever about the thus predetermined pivot axis in respect of the transmission member and of the first clamping-strap end adjacent to the latter. The clamping screw engages at an axial distance from the first clamping-strap end on the bent tab of the other clamping-strap end, in that an adjustable nut is screwed onto this end and is supported axially on the tab of the second clamping-strap end. The clamping lever is equipped, between the pivot axis and the bent tab on the first clamping-strap end, with a circumferential eccentric which presses onto the bent tab of this first clamping-strap end via a pressure plate. The clamping force is transmitted from the eccentric of the clamping lever to the two bent tabs of the two clamping-strap ends via the pressure plate. A disadvantage of this clamping device is that, in the event of a high clamping force and in view of the given unfavourable lever arm, a high bending moment acts on the bent tabs at the two clamping-strap ends and distorts these tabs. The necessary clamping force is therefore not obtained, with the result that the user has to make several readjustments. A further essential disadvantage is that a high surface pressure is effective on the sliding face between the eccentric of the clamping lever on the one hand and the pressure plate on the other hand. In theory, linear contact takes place in this region. Under high clamping forces, there is the danger that the surface of the sliding track will be destroyed due to an excessive surface pressure. The result is digging in and seizing. The clamping lever can then still be actuated only with the greatest effort.

SUMMARY OF THE INVENTION

In keeping with these objects and with others which will become apparent hereinafter, one feature of the present invention resides, briefly stated, in a clamping device of the above mentioned general type in which the transmission member, the clamping lever, and the ends of the clamping strap form a toggle-lever device which, during clamping, contracts the clamping strap in the end region in a manner essentially free of any bending moment.

When the clamping device is designed in accordance with the present invention, a rapid and reliable clamping by means of the contracting toggle-lever system is possible. Operation is simple. A secure clamping by a high clamping force is guaranteed. Any wear and any deformations are avoided, because the clamping strap is essentially free of any bending moment, even in the region of its ends, and is subjected to tensile load in the circumferential direction only. With the lack of wear and with the lack any deformations, the clamping force which takes effect in the clamping state remains constant, so that there is no need for the user to make any readjustment. Furthermore, the clamping device is simple and compact, requires only a few individual parts and is therefore cheap. Since no threaded elements are used, moreover, the clamping device is unsusceptible to dust. It can be handled easily and without great effort and, at the same time, without an auxiliary tool or any expert knowledge.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a diagrammatic top view of a protective hood, with a clamping device thereon, FIG. 2 shows a diagrammatic section along the line II—II in FIG. 1 on a larger scale, FIG. 3 shows a side view only of the clamping lever of the clamping device in FIG. 1, FIG. 4 shows a view of the clamping lever in the direction of the arrow IV in FIG. 3, FIG. 5 shows a diagrammatic section along the line V—V in FIG. 4, FIG. 6 shows a diagrammatic side view of part of the clamping device in the clamping position and, by means of broken lines, in the opening position.

DESCRIPTION OF A PREFERRED EMBODIMENT

The drawings show a clamping device 10 which, for example, is connected firmly to a protective hood 11 and which serves for clamping the protective hood 11 on a, for example, cylindrical clamping collar 12, indicated only diagrammatically, of a hand-operated machine tool, especially an angle grinder or such like electrical tool, not shown any further. The basic arrangement corresponds, for example, to that according to German Offenlegungsschrift 3,638,337, to which attention is drawn in this respect in order to avoid repetition.

The clamping device has a clamping strap 13 which consists especially of sheet metal and which is guided round a, for example, semicircular flange 14 of the protective hood 11 and is fastened thereto, for example by welding or the like. The clamping strap 13 can be clamped together to form a virtually closed ring, the longitudinal mid-axis 15 of which coincides approximately with that of the semicylindrical flange 14. The clamping strap 13 is thus far similar to a pipe clip. It can be clamped together in the region of the two ends 16 and 17 which are spaced in the circumferential direction. The clamping device 10 possesses, furthermore, an approximately arcuately curved clamping lever 18 which is pivotable at one end 19 about a pivot axis 20 in respect of the first end 16 of the clamping strap 13 located there. The pivot axis 20 extends approximately parallel to the longitudinal mid-axis 15 of the tensioned clamping strap 13. A transmission member 21 engages in an articulated manner on the clamping lever 18. This transmission member is designed as a circumferential tension member and, in the exemplary embodiment illustrated, as a multilayer link which here has altogether three mutually parallel flat links made of sheet metal. This is especially cost-effective. In another exemplary embodiment not shown, the transmission member 21 consists, instead, of a single-layer link or of one which has even more layers.

The transmission member 21 engages on the second end 17 of the clamping strap 13 at a distance from the pivot axis 20. It ensures that, during clamping by means of the clamping lever 18, the two ends 16 and 17 of the clamping strap are brought nearer to one another in a circumferential direction, with the latter being clamped together.

The arrangement is, in particular, such that the transmission member 21, together with the clamping lever 18 and the two ends 16 and 17 of the clamping strap 13, form a toggle-lever device which contracts the clamping strap 13 during clamping. Details of this device are explained below.

The transmission member 21 connects the clamping lever 18 to the second end 17 of the clamping strap 13 in the circumferential direction. For this purpose, the transmission member 21 is mounted on the second end 17 of the clamping strap 13 so as to be pivotable about a pivot axis 22 extending approximately parallel to the pivot axis 20 of the clamping lever 18. The clamping lever 18 engages with its end 19 on the first end 16 of the clamping strap 13 in such an articulated manner that the clamping lever 18 is pivotable about the pivot axis 20 in this region. The two ends 16 and 17 of the clamping strap 13 contain a bearing bolt 23, 24 which is fastened thereto and which is attached there fixedly in terms of rotation, for example pressed in and/or caulked. The two ends 16 and 17 of the clamping strap 13 have bearing lugs shaped in an approximately hinge-like manner, for example bent down. Longitudinally directed recesses (25 and 26) are located in the region of these bearing lugs. As can be seen in FIG. 2, the recess 25 in the first end 16 is wider than the recess 26 in the second end 17. The clamping lever 18 engages into this wider recess 25. It is pivotably mounted there on the bearing bolt 23 which passes through corresponding bores in its end 19.

The transmission member 21 extends, starting from the second end 17 of the clamping strap 13 and the pivot axis 22 located there, in the circumferential direction beyond the first end 16 of the clamping strap 13 and the pivot axis 20 located there. It is mounted on the clamping lever 18 at a distance from the latter so as to be pivotable about the pivot axis 27. This pivot axis 27 too extends approximately parallel to the pivot axes 20 and 22. This pivot axis 27 is placed in a particular way in respect of the pivot axes 20 and 22. This is illustrated especially by means of FIG. 6. There, a straight line 28 is marked as an auxiliary line which connects the two pivot axes 20 and 22 to one another in the illustrated contracted state of the clamping strap 13. The pivot axis 27 in the clamping lever 18 is selected so that, in the clamping position according to FIG. 6, it is located in a radial region between the straight line 28 and the contracted clamping strap 13. The distance between the pivot axis 27 and the straight line 28 in the radial direction inwards is marked by s in FIG. 6. It amounts, in the clamping position, to at least 2.5 mm. This guarantees that, in the clamping position according to FIGS. 1 and 6, which is represented in FIG. 6 by unbroken lines, the clamping lever 18 is pressed resiliently in the radial direction inwards and against the clamping strap 13 and is held securely there. This is achieved in that, during clamping as a result of the pivoting of the clamping lever 18, a clamping force acts radially inwards on the straight line 28 and, together with the distance s, results in a torque which acts on the clamping lever 18. When the clamping lever 18 is being closed, the entire clamping device 10 is tensioned in a similar way to a strong spring, and when the dead-centre position is being overcome the clamping lever 18 is pressed resiliently against the clamping strap 13 and is held securely there. Operation is therefore extremely simple. A secure clamping by means of a very high clamping force is obtained. The clamping force remains constant, so that there is no need for any readjustment. Moreover, in the clamping device 10, neither wear nor deformations are to be seen, so that, for this reason too, the clamping force remains constant. The clamping device 10 is simple, compact and cheap. It requires only a few parts. A further advantage is its insusceptibility to dust. The clamping device 10 thus allows a rapid and reliable clamping of the protective hood 11, without a special tool, a particular routine or expert knowledge or the like being necessary for this.

As shown particularly in FIG. 2, the end of the transmission member 21 on the left there engages into the recess 26 at the second end 17 of the clamping strap. There, this end is mounted pivotably about the pivot axis 22 on the bearing bolt 24 arranged fixedly in terms of rotation. The clamping lever 18 also contains, in the middle, an approximately slot-shaped recess 29, at least on the region of circumferential extension which extends from the pivot axis 27 as far as the first end 16 of the clamping strap 13. The other end of the transmission member 21 engages into this recess 29. It is pivotably mounted there on a bolt 30 of the clamping lever 18. It is assumed, in the first place, that the bolt 30 is a continuously cylindrical bolt, the longitudinal mid-axis of which coincides with the pivot axis 27. The toggle-lever device then has a permanently set lever ratio.

It is evident particularly from FIGS. 4 and 5 that the clamping lever 18 has an approximately U-shaped profile 31 in cross-section, the U-orifice pointing in the radial direction, for example inwards in the exemplary embodiment shown, with the result that a smoothly continuous clamping lever 18 is obtained on the outside. Instead, however, the U-orifice can also point in the radial direction outwards. This cross-section approximately in the form of a U-shaped profile extends at least over approximately three quarters of the circumferential length of the clamping lever 18. This gives the clamping lever 18 a high bending resistance for the use of only a small amount of material. At the free end located opposite the pivot axes 20 and 27, the clamping lever 18 is equipped with a rounding 32, thereby assisting the handling and, for example, avoiding any pressure points during actuation. This rounding 32 is formed, for example, in that a wider web 33 running in the extension of the base web of the U-shaped profile is bent round inwards through 180° at the end.

So that, for the sake of safety, it is impossible for the user to bypass the association of the size of the protective hood 11 with a specific rotational speed of the hand-operated machine tool, for example an angle grinder, not shown any further, by bending open the clamping strap 13, a measure is taken to ensure that the opening angle of the clamping lever 18 and the opening of the clamping strap 13 are limited. For this purpose, there are provided on the clamping lever 18 a stop 34 and, assigned to this, on the transmission member 21 a stop 35 which, in the opening position of the clamping lever 18 and of the clamping strap 13 which is represented by broken lines in FIG. 6, butt against one another, thereby limiting this opening angle. On the transmission member 21, this stop 35 is formed from a projection projecting approximately radially. On the clamping lever 18, this stop 34 is formed, for example, on an inner web which consists, for example, of the base web of the U-shaped profile 31, the stop 34 then being formed by the end face of the base web limiting the recess 29 at one end. Thus, during production, the stops 34 and 35 are equivalent to formed-on integral parts of the clamping lever 18 and of the transmission member 21 respectively and therefore require no additional outlay. If the stops 34, 35 were absent, during the opening of the clamping strap 13 beyond the limitation the boss 36 on the clamping strap 13 and therefore the protective hood 11 could be dismounted in any position from a groove, not shown any further, in the clamping collar 12 and consequently the association bypassed.

This is prevented with simple means by the stops 34, 35.

A cylindrical bolt 30 in the two legs of the approximately fork-shaped end 19 of the clamping lever 18 is assumed, in the first place, in the following. In principle, the closing moment on the clamping lever 18 is fixed so that, for example, all sizes of protective hood for grinding wheels of, for example, 180 mm diameter to 350 mm diameter, used in angle grinders, can be clamped fixedly in terms of rotation and reliably even under high load. This closing moment on the clamping lever 18 has a fixed value and is therefore to be synchronised once in view of the production tolerances of the individual elements. This synchronisation takes place, for example, by means of the transmission member 21, of which the manufacturer makes available, for example, three versions which have different hole spacings with a gradation of, for example, 0.3 mm.

Another especially advantageous possibility for setting the closing moment on the clamping lever 18 is shown in FIG. 2. As is evident, there the bolt 30 of the clamping lever 18 is designed as an eccentric bolt having a middle, for example rotationally symmetrical eccentric step 37. In this version, therefore, the associated end of the transmission member 21 is mounted on this eccentric step 37 so as to be pivotable about the pivot axis 27. The bolt 30 is held in the clamping lever 18 so as to be rotationally adjustable about the axis of rotation 38 eccentric in respect of the pivot axis 27 and so as to be fixable in the set rotary position. The bolt 30 is equipped, for example at one end, with an engagement face 39, on which it is possible to engage in order to adjust the eccentricity by rotational adjustment about the axis of rotation 38. The engagement face 39 consists, for example, of an outer polygon, as shown. In another exemplary embodiment nob shown, instead an inner polygon, for example inner hexagon, an axially recessed slot, cross slot or the like, is provided. After the setting of the eccentricity, the bolt 30 can be fixed in the set rotary position in respect of the clamping lever 18, for example clamped, caulked, pinned or, for example, welded on.

In this design of the bolt 30 according to FIG. 2, therefore, the synchronisation of the closing moment for the clamping lever 18 can take place by the rotation of the bolt 30 about the axis of rotation 38 and consequently by a variation of the eccentricity. A continuous adjustment is thereby possible in a simple way.

Another likewise advantageous possibility, not shown, for setting the closing moment on the clamping lever 18 is provided if the length of the clamping strap 13, as seen in the circumferential direction, is variable and if the closing moment on the clamping lever 18 is therefore adjustable. For this purpose, the clamping strap 13 can be subdivided in the circumferential direction at any suitable point. It can be advantageous, for example, if the subdivision point is provided between the clamping-strap portion fixed to the flange 14 of the protective hood 11 and the remaining clamping-strap portion which, in contrast, is loose. The two clamping-strap portions are held together by means of a connecting device which can be set for the variation in length of the clamping strap 13 and which can be secured in the set position. The connecting device can be designed in the most diverse ways. In one embodiment, the connecting device engages on the clamping-strap portions in the subdivision region virtually solely in the circumferential direction, the connecting forces exerted thereby being effective virtually without any lever arm in the circumferential direction of the clamping strap and as pure tensile forces. In another embodiment, in the subdivision region the clamping-strap portions are, for example, bent at least slightly outwards, there passing through the bent ends a set member, for example a set screw, which can be designed as a slotted screw, hexagon-socket screw or the like. The set screw bears with its head on one end. Held fixedly in terms of rotation, for example welded, on the end of the other clamping-strap portion is, for example, a nut, threaded sleeve or the like, into which the set screw engages. The set position is secured, for example, by securing the set screw against unintentional rotational adjustment, either in the region of the screw head or at the other end where it passes through the nut, threaded sleeve or the like. There, for example, securing by caulking, welding or the like can be carried out. The subdivision of the clamping strap 13 and the connecting device which holds the clamping strap together have the advantage that the closing moment on the clamping lever 18 can be set quickly and simply and at the same time continuously, this arrangement being simple and cost-effective. Readjustment is possible at any time, as required.

It will be understood that each of the elements described above, or two or more together, may also find a useful application in other types of constructions differing from the types described above.

While the invention has been illustrated and described as embodied in a clamping device for clamping a protective hood on the clamping collar of a hand-operated machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

I claim:

1. A clamping device for clamping a protective hood as a dust proof on a clamping collar of an angle grinder, comprising, a clamping strap which has ends and is clampable together in the region of said ends; a clamping lever having one end and being pivotable at said one end about a pivot axis in respect of one of said ends of said clamping strap; a transmission member which is engaged by said clamping lever and which engages at a distance from said clamping lever another of said ends of said clamping strap and during clamping brings said ends of said clamping strap nearer to one another, said transmission member, said clamping lever, and said ends of said clamping strap forming a toggle-lever device which during clamping contracts said clamping strap in the region of said ends of said clamping strap in a manner essentially free of any bending moment; and a bolt provided in said lever and formed as a rotationally adjustable eccentric bolt, said transmission member being pivotally mounted on said rotationally adjustable eccentric bolt of said clamping lever whereby the clamping force remains constant so that there is no need for any readjustment.

2. A clamping device as defined in claim 1, wherein said transmission member connects said clamping lever to said another end of said clamping strap in a circumferential direction.

3. A clamping device as defined in claim 1, wherein said clamping lever is mounted at said one end of said clamping lever on said one end of said clamping strap so as to be pivotable about the pivot axis approximately parallel to a longitudinal mid-axis of said clamping strap.

4. A clamping device as defined in claim 1, wherein said transmission member is mounted on said another end of said clamping strap so as to be pivotable about an axis approximately parallel to said pivot axis of said clamping member.

5. A clamping device as defined in claim 4, wherein said transmission member extends from said another end of said clamping strap and from said axis about said transmission member is pivotable, in a circumferential direction before said one end of said clamping strap and is mounted pivotably on said clamping lever at a distance from said one end of said clamping strap.

6. A clamping device as defined in claim 5, wherein said transmission member is pivotable about a pivot axis which is located in a clamping position in a radial region between said clamping strap in its contracted condition and a straight line which connects said pivot axis about which said clamping lever is pivotable at said one end of said clamping strap to the pivot axis about which said transmission member is pivotable at said another end of said clamping strap.

7. A clamping device as defined in claim 6, wherein said transmission member is mounted exchangeably so that said transmission member which has one spacing between said pivot axis about which it is mounted pivotally on said another end of said clamping strap and said pivot axis about which it is mounted pivotably on said clamping member can be removed and replaced with another transmission member which has a different spacing between said pivot axes so as to set a different closing member on said clamping lever.

8. A clamping device as defined in claim 6, wherein said pivot axis about which said transmission member is mounted pivotably on said clamping member is spaced from said straight line by a distance of at least 2.5 mm.

9. A clamping device as defined in claim 8, wherein said ends of said clamping strap are provided with bearing lugs shaped in an approximately hinge-like manner.

10. A clamping device as defined in claim 9, wherein said bearing lugs of said ends of said clamping strap have a bearing bolt fastened to said bearing lugs.

11. A clamping device as defined in claim 9, wherein said bearing lugs are bend downwardly.

12. A clamping device as defined in claim 1, wherein said ends of said clamping strap have longitudinally extending recesses provided in a middle of said ends.

13. A clamping device as defined in claim 1, wherein said ends of said clamping strap have a bearing bolt fastened to said ends.

14. A clamping device as defined in claim 13, wherein said transmission member has one end engaging into said recess of said another end of said clamping strap and being pivotably mounted on said bearing bolt.

15. A clamping device as defined in claim 1, wherein said clamping lever has a longitudinally directed recess provided in a middle of said clamping lever, said transmission member having an other end engaging in said longitudinally directed recess.

16. A clamping device as defined in claim 15, wherein said longitudinally directed recess is located in a region of a circumferential extension of said clamping lever, which region extends from a pivot point of said clamping lever to said one end of said clamping strap.

17. A clamping device as defined in claim 1, wherein said eccentric bolt has a middle, said transmission member having an end which is pivotably mounted on said middle of said eccentric bolt.

18. A clamping device as defined in claim 1, wherein said eccentric bolt of said clamping lever has one bolt end provided with an engagement face for setting an eccentricity by rotational adjustment.

19. A clamping device as defined in claim 18, wherein said engagement face is a formation formed as one of an outer polygon, an inner polygon, an axially recessed slot and a cross slot.

20. A clamping device as defined in claim 18; and further comprising means for fixing said eccentric bolt after setting of its eccentricity, in a set rotary position in respect of said clamping lever.

21. A clamping device as defined in claim 20, wherein said fixing means is a means of a clamp, a caulk, a pin and a welding seam.

22. A clamping device as defined in claim 1, wherein said one end of said clamping strap has a recess which is wider than said another end of said clamping strap, said ends of said clamping strap having a bearing bolt, said one end of said clamping lever engaging in said recess and being pivotally mounted on said bearing bolt at said one end of said clamping strap.

23. A clamping device as defined in claim 1, wherein said transmission member is formed as a circumferential tension member.

24. A clamping device as defined in claim 1, wherein said transmission member is formed as a single-layer link.

25. A clamping device as defined in claim 1, wherein said transmission member is formed as a multi-layer link.

26. A clamping device as defined in claim 1, wherein said clamping member is arcuately curved.

27. A clamping device as defined in claim 1, wherein said clamping lever has in cross-section a substantially U-shaped profile with a U-orifice pointing in a radial direction.

28. A clamping device as defined in claim 27, wherein said U-orifice of said substantially U-shaped profile points inwards.

29. A clamping device as defined in claim 27, wherein said U-shaped profile extends at least over substantially three-quarters of the circumferential length of said clamping lever.

30. A clamping device as defined in claim 1, wherein said clamping lever has a free projecting end provided with a rounding.

31. A clamping device as defined in claim 30, wherein said rounding at said free projecting end of said clamping lever extends over 180°.

32. A clamping device as defined in claim 1, wherein said clamping strap has a variable length as seen in a circumferential direction so as to set a closing member on said clamping lever.

33. A clamping device as defined in claim 1, wherein said clamping strap is subdivided in a circumferential direction; and further comprising a connecting device which holds together said subdivided clamping strap and can be set for a variation in a length of said clamping strap and secured in a set position.

34. A clamping device for clamping a protective hood as a dust proof on a clamping collar of an angle grinder, comprising, a clamping strap which has ends and is clampable together in the region of said ends; a clamping lever having one end and being pivotable at said one end about a pivot axis in respect of one of said ends of said clamping strap; and a transmission member which is engaged by said clamping lever and which engages at a distance from said clamping lever another of said ends of said clamping strap and during clamping brings said ends of said clamping strap nearer to one another, said transmission member, said clamping lever, and said ends of said clamping strap forming a toggle-lever device which during clamping contracts said clamping strap in the region of said ends of said clamping strap in a manner essentially free of any bending moment said clamping lever and said transmission member being provided with corresponding stops which in an opening position of said clamping lever and said clamping strap abut against one another so as to limit an opening angle.

35. A clamping device as defined in claim 34, wherein said stub of said transmission member is formed as a projection which projects approximately radially.

36. A clamping device as defined in claim 34, wherein said clamping lever has an inner web, said stub being formed on said inner web of said clamping lever.

37. A clamping device as defined in claim 36, wherein said clamping lever has in cross-section a substantially U-shaped profile with a base web which forms said inner web, said stub of said clamping lever being formed on said base web of said U-shaped profile.

38. A clamping device for clamping a protective hood on a clamping collar of an angle grinder, comprising, a clamping strap which has ends and is clampable together in the region of said ends; a clamping lever having one end and being pivotable at said one end about a pivot axis in respect of one of said ends of said clamping strap; and a transmission member which is engaged by said clamping lever and which engages at a distance from said clamping lever another of said ends of said clamping strap and during clamping brings said ends of said clamping strap nearer to one another, said transmission member, said clamping lever, and said ends of said clamping strap forming a toggle-lever device which during clamping contracts said clamping strap in the region of said ends of said clamping strap in a manner essentially free of any bending moment, said transmission member being mounted on said another end of said clamping strap so as to be pivotable about an axis approximately parallel to said pivot axis of said clamping member, said transmission member extending from said another end of said clamping strap and from said axis about said transmission member is pivotable, in a circumferential direction before said one end of said clamping strap and is mounted pivotably on said clamping lever at a distance from said one end of said clamping strap, said transmission member being pivotable about a pivot axis which is located in a clamping position in a radial region between said clamping strap in its contracted condition and a straight line which connects said pivot axis about which said clamping lever is pivotable at said one end of said clamping strap to the pivot axis about which said transmission member is pivotable at said another end of said clamping strap said pivot axis about which said transmission member being mounted pivotably on said clamping member is spaced from said straight line by a distance of at least 2.5 mm, said ends of said clamping strap being provided with bearing lugs shaped in an approximately hinge-like manner, said bearing lugs of said ends of said clamping strap having longitudinally extending recesses provided in a middle of said bearing lugs such that the toggle lever device has a permanently set lever ratio.

39. A clamping device for clamping a protective hood as a dust proof on a clamping collar of an angle grinder, comprising, a clamping strap which has ends and is clampable together in the region of said ends; a clamping lever having one end and being pivotable at said one end about a pivot axis in respect of one of said ends of said clamping strap; and a transmission member which is engaged by said clamping lever and which engages at a distance from said clamping lever another of said ends of said clamping strap and during clamping brings said ends of said clamping strap nearer to one another, said transmission member, said clamping lever, and said ends of said clamping strap forming a toggle-lever device which during clamping contracts said clamping strap in the region of said ends of said clamping strap in a manner essentially free of any bending moment, said clamping lever having a bolt formed as a rotationally adjustable eccentric bolt which has a middle, said transmission member being pivotally mounted on said bolt of said clamping lever and having an end which is pivotably mounted on said middle of said eccentric bolt, said middle of said eccentric bolt being formed as a rotationally symmetrical eccentric step on which said end of said transmission member is pivotably mounted.

* * * * *